United States Patent
Li et al.

(10) Patent No.: US 11,123,670 B2
(45) Date of Patent: Sep. 21, 2021

(54) METHOD FOR PREPARING SIMULTANEOUS NITROGEN AND PHOSPHORUS REMOVAL LIGHTWEIGHT MATERIAL AND THE USE THEREOF

(71) Applicant: NANJING UNIVERSITY, Nanjing (CN)

(72) Inventors: RuiHua Li, Nanjing (CN); SiWen Shen, Nanjing (CN); LiSong Zhou, Nanjing (CN); LiYu Luo, Nanjing (CN); MengSha Guan, Nanjing (CN); Wei Wang, Nanjing (CN); ZhiBin Ge, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 38 days.

(21) Appl. No.: 16/720,428

(22) Filed: Dec. 19, 2019

(65) Prior Publication Data

US 2020/0338485 A1   Oct. 29, 2020

(30) Foreign Application Priority Data

Apr. 23, 2019   (CN) .......................... 201910329881.4

(51) Int. Cl.
  *B01D 39/20* (2006.01)
  *C02F 3/28* (2006.01)
  (Continued)

(52) U.S. Cl.
  CPC ..... *B01D 39/2051* (2013.01); *B01D 39/2093* (2013.01); *C02F 3/2833* (2013.01);
  (Continued)

(58) Field of Classification Search
  CPC ............ B01D 39/2051; B01D 39/2093; B01D 2239/10; B01D 2257/102; B01D 2257/55;
  (Continued)

(56) References Cited

U.S. PATENT DOCUMENTS

2016/0102000 A1*  4/2016  Theodore .................. C02F 1/70
                                                                210/739

FOREIGN PATENT DOCUMENTS

CN        107304075 A     * 10/2017

OTHER PUBLICATIONS

Machine-generated English Translation of CN 107304075, generated on Feb. 19, 2021.*

* cited by examiner

*Primary Examiner* — Fred Prince
(74) *Attorney, Agent, or Firm* — Dragon Sun Law Firm, PC; Jinggao Li, Esq.

(57) ABSTRACT

The present invention discloses a method for preparing a simultaneous nitrogen and phosphorus removal lightweight material and the use thereof, and belongs to the technical field of environmental functional materials and sewage treatment. In the present invention, sulfur and an iron-based component are thoroughly melted and dispersed to obtain a molten mixture, where the iron-based component is a mixture of iron sulfides with carbonates of calcium and magnesium; and the above molten mixture is subjected to a foaming treatment to form the simultaneous nitrogen and phosphorus removal lightweight material. The simultaneous nitrogen and phosphorus removal lightweight material of the present invention has characteristics of high porosity, a large specific surface area, a light weight, and a high reaction activity. The resultant lightweight material, used as a microbial carrier and an electron donor for a biochemical reaction, is applied to a reactor such as a fixed bed or fluidized bed for sewage treatment, with the advantages of a good microbial attachment performance, a high denitrification rate and a good phosphorus removal effect.

7 Claims, 4 Drawing Sheets

(51) Int. Cl.
*C02F 3/30* (2006.01)
*C02F 3/34* (2006.01)
*C02F 101/10* (2006.01)
*C02F 101/16* (2006.01)
*C02F 103/06* (2006.01)
*C02F 3/00* (2006.01)

(52) U.S. Cl.
CPC ............... *C02F 3/305* (2013.01); *C02F 3/34* (2013.01); *B01D 2239/10* (2013.01); *B01D 2257/102* (2013.01); *B01D 2257/55* (2013.01); *C02F 3/2806* (2013.01); *C02F 2003/001* (2013.01); *C02F 2101/105* (2013.01); *C02F 2101/16* (2013.01); *C02F 2103/06* (2013.01); *C02F 2209/15* (2013.01); *C02F 2209/18* (2013.01)

(58) Field of Classification Search
CPC .......... C02F 3/34; C02F 3/2833; C02F 3/305; C02F 2003/001; C02F 2209/15; C02F 2209/18; C02F 3/2806; C02F 2101/105; C02F 2101/16; C02F 2103/06
USPC ....... 210/603, 607, 615, 616, 617, 631, 903, 210/906
See application file for complete search history.

METHOD FOR PREPARING SIMULTANEOUS NITROGEN AND PHOSPHORUS REMOVAL LIGHTWEIGHT MATERIAL AND THE USE THEREOF

TECHNICAL FIELD

The present invention belongs to the technical field of environmental functional materials and sewage treatment, and in particular relates to a method for preparing a simultaneous nitrogen and phosphorus removal lightweight material and the use thereof.

BACKGROUD

In recent years, the rapid development of the national economy and the acceleration of the urbanization process have caused the eutrophication of water bodies to become more and more serious. The main cause of eutrophication of water bodies is the nitrogen and phosphorus in water bodies being out of standard. Therefore, the advanced treatment of nitrogen and phosphorus in sewage has become a focus issue of environmental protection.

At present, sewage treatment mainly adopts biological methods which are widely used due to its low cost. Autotrophic and heterotrophic denitrification technologies are widely used for the removal of nitrogen from the sewage, and Chemical phosphorus removal is the most fundamental method for phosphorus removal of the sewage. Since heterotrophic denitrification requires the addition of a carbon source, there are problems such as a high cost and a risk of COD leakage; and chemical phosphorus removal requires the addition of a coagulant, which has problems such as a high cost and complicated control and management. In recent years, more and more researches have focused on conducting the nitrogen and phosphorus removal of sewage treatment with a natural mineral material such as pyrrhotite and siderite, and has achieved certain effects. However, for them, the nitrogen and phosphorus removal rate is generally lower, and the nitrogen and phosphorus removal requires a longer hydraulic retention time, which limits their large-scale applications.

Currently, during the simultaneous nitrogen and phosphorus removal of sewage by adopting a sulfur-based autotrophic denitrification process, the most widely used is a "sulphur-limestone autotrophic denitrification" (SLAD) system, of which the reaction chemical equation is as follows:

$$55S + 50NO_3^- + 38H_2O + 20CO_2 + 4NH_4^+ \rightarrow 4C_5H_7O_2N + 5N_2 + 55SO_4^{2-} + 64H^+ \quad (1)$$

The SLAD system is an autotrophic denitrification process using sulfur as an electron donor, with the advantages of no need for additional addition of a carbon source, less sludge output, a low cost, and a simple process. The system has a high nitrogen removal rate, but a poor phosphorus removal effect, and additionally also has a problem that the hardness of water and the sulfate are too high. In the SLAD system, when the sulfur and limestone have a smaller particle size, the specific surface area is larger, and the denitrification rate is higher, but due to the small particle size, the system is prone to clogging and thus cannot operate. Moreover, delamination is likely to be caused during rinsing due to the difference in density of the limestone particles and the sulfur particles, thereby affecting the operation effect of the system after rinsing.

Upon searching, the patent application document with the patent application number of CN201010524339.3, which was filed on Oct. 29, 2010, has disclosed a method for removing nitrogen and phosphorus by using pyrite as a biochemical filler, of which the reaction equation is as follows:

$$NO_3^- + 5/9 FeS_2 + 8/9 H_2O \rightarrow 5/9 Fe(OH)_3 + 1/2 N_2 \uparrow + SO_4^{2-} + 1/9 H^+ \quad (2)$$

This biofilter has the advantage of being capable of conducting simultaneous nitrogen and phosphorus removal, and the disadvantage of a lower denitrification rate.

Upon searching, the patent application document with the patent application number of CN201310695460.6, which was filed on Dec. 17, 2013, has disclosed a natural pyrrhotite biofilter and a method for conducting simultaneous nitrogen and phosphorus removal by using the same, of which the reaction equation is as follows:

$$NO_3^- + 1/3 FeS + 2/3 H_2O \rightarrow 1/2 N_2 \uparrow + 2/3 SO_4^{2-} + 1/3 Fe(OH)_3 + 1/3 H^+ \quad (3)$$

The biological filter can conduct conducting simultaneous nitrogen and phosphorus removal, and has a denitrification rate which is increased as compared with that of a pyrite filter, but is significantly decreased as compared with that of SLAD. The pyrite biofilter and the pyrrhotite biofilter also have the same problems as the SLAD system, that is, the particle size is larger, and the denitrification rate is not high; the particle size being small can increase the denitrification rate, but the system is prone to clogging and thus cannot operate normally.

Upon searching, the patent application document with the patent application number of CN201811034113.8, which was filed on Sep. 5, 2018 has disclosed a coupled filler autotrophic denitrification biofilter and the application thereof, which is characterized in that mixed particles of natural pyrrhotite, sulfur and limestone are used as a filler, placed in a reactor, and subjected to inoculation and biofilm formation, so as to form a autotrophic denitrification biofilter. The biofilter combines the advantages of the SLAD and iron sulfides biofilters, has better nitrogen and phosphorus removal effects, and forms a synergistic effect of sulfur and iron sulfides biochemical reactions to a certain extent, and improves the nitrogen and phosphorus removal rate, but this method only mixes the pyrrhotite, sulfur and limestone particles simply, such that the synergistic effect between the sulfur and iron sulfides biochemical reactions and the respective denitrification reactions are restricted by the particle size and cannot be further improved; the difference in density among the sulfur, limestone and iron sulfides is greater, delamination is more likely to occur during rinsing, resulting in damage to the system; and the specific surface area of the material is small, which is not conducive to the attachment and utilization of microorganisms, etc.

Upon searching, the Chinese invention patent with the patent application number of CN201811453849.9 has disclosed that by combining iron sulfides, sulfur and carbonate minerals as respective reaction walls, a good simultaneous nitrogen, phosphorus and arsenic removal effect can be achieved. The Chinese invention patent with the patent application number of CN201610515192.9 has disclosed the use of sulfur powder, sponge iron powder and cement as fillers, which also increases the removal rate of nitrate. However, neither of the above two patents has disclosed a method of preparing a simultaneous nitrogen and phosphorus removal lightweight material by highly melting and mixing sulfur and an iron-based component.

SUMMARY

The technical problem to be solved by the present invention is as follows.

In view of the problems of a larger particle size, a small specific surface area, a lower nitrogen removal rate and the like of a reductive sulfide filler in the existing sewage treatment technology, the present invention provides a simultaneous nitrogen and phosphorus removal lightweight material, where sulfur and an iron-based component are highly melted and mixed, where the iron-based component is a mixture of iron sulfides with carbonates of calcium and magnesium, or iron sulfides; and the lightweight material is formed by a foaming treatment. The simultaneous nitrogen and phosphorus removal lightweight material of the present invention has advantages of high porosity, a large specific surface area, a light weight, a high reaction activity, and a good microbial attachment performance. Moreover, due to the high fusion of sulfur and iron sulfides, the H+ produced by sulfur autotrophic denitrification will accelerate the dissolution of iron sulfides, facilitate the process of the iron sulfides autotrophic denitrification, strengthen the synergistic effect of the sulfur autotrophic denitrification and the iron sulfides autotrophic denitrification, and thus has a higher denitrification rate and a better simultaneous nitrogen removal effect.

The technical solution of the present invention is as follows.

A method for preparing a simultaneous nitrogen and phosphorus removal lightweight material, includes the steps of:

S1: weighing sulfur and an iron-based component in a mass ratio of 6:1-1:2, wherein the iron-based component is a mixture composed of iron sulfides and carbonates of calcium and magnesium in a mass ratio of 1:0-1:4;

S2: when the mass ratio of the sulfur to the iron-based component is ≤3, heating and melting the aforementioned iron-based component and sulfur to obtain a molten mixture, and introducing a gas preheated to a temperature not lower than 50° C. for a physical foaming treatment;

when the mass ratio of the sulfur to the iron-based component is >3, taking 95 wt % of the aforementioned iron-based component, heating and melting it together with the sulfur to obtain a molten mixture, then taking and mixing the remaining 5 wt % of the iron-based component with a chemical foaming agent, and adding into the molten mixture for a foaming treatment;

S3: cooling and molding the foamed molten mixture to obtain the simultaneous nitrogen and phosphorus removal lightweight material in which the sulfur is highly fused and mixed with the iron-based component.

From the perspective of cost, the selection of physical foaming is superior to chemical foaming. For the molten mixture obtained by using sulfur and an iron-based component as a raw material, the present invention has found that, when the mass ratio of the sulfur to the iron-based components is ≤3, the obtained molten mixture of the sulfur and the iron-based components has a higher viscosity and can be foamed in a physical or chemical foaming manner, preferably in the physical foaming manner; and when the mass ratio of the sulfur to the iron-based component is >3, foaming can only be carried out in the chemical foaming manner in that the selection of the physical foaming manner cannot achieve a good foaming effect.

Furthermore, it should be particularly noted that, when the molten mixture is subjected to a foaming treatment in the physical foaming manner, the introduced gas needs to be preheated at a temperature for preheating of 50° C.-100° C. Since the molten mixture is at a high temperature of 140-160° C., local solidification of the molten mixture occurs if the introduced gas is at room temperature, thereby affecting the molten state of the molten mixture, without ensuring sufficient and uniform foaming.

When the molten mixture is subjected to a foaming treatment in a chemical foaming manner, foaming is usually carried out using sodium bicarbonate in consideration of the cost of the chemical foaming agent. However, since the weight of sodium bicarbonate is lighter, the added sodium bicarbonate cannot be dispersed into the molten mixture completely, so that the foaming effect cannot be exerted sufficiently. In order to solve this difficult problem, in an experiment, a small amount of the iron-based component (from 5% by weight of the iron-based component weighed before the mixing of raw materials) was mixed with sodium bicarbonate and then added into the molten mixture, because the iron-based component has a higher weight, and can be completely dispersed in the molten mixture together with sodium bicarbonate, thereby achieving sufficient foaming.

As an aspect of the present invention, the temperature for the heating and melting is 140-160° C.

As an aspect of the present invention, the iron-based component has a particle diameter of ≤0.2 mm, and more preferably ≤0.1 mm.

Preferably, the iron sulfides includes one or both of pyrite or pyrrhotite, and the calcium and magnesium carbonate minerals include one or more of limestone, calcite, dolomite, or magnesite.

As an aspect of the present invention, the chemical foaming agent includes one or both of sodium bicarbonate and a blowing agent AC.

As an aspect of the present invention, the molten mixture is continuously stirred during heating and melting, and it is considered that a uniform molten mixture is obtained when there is no lump-like or granular matter existed in the molten mixture and the color of the molten mixture is uniform and stable; and then the molten mixture is subjected to a foaming treatment, and the molten mixture is continuously stirred during the foaming treatment to ensure uniform foaming of the molten mixture.

As an aspect of the present invention, the cooling and molding method includes wet granulation, steel band granulation, or post-solidification crushing granulation. The wet granulation refers to adding a high-temperature molten mixture dropwise into water, and cooling to form a solid particulate material; the steel band granulation refers to adding a high-temperature molten mixture onto a steel band dropwise, and cooling to form a solid particulate material; and the post-solidification crushing granulation refers to cooling a high-temperature molten mixture by air, and solidifying into a solid particulate material.

As another aspect of the present invention, the present invention provides a use of a simultaneous nitrogen and phosphorus removal lightweight material prepared according to the aforementioned method: the simultaneous nitrogen and phosphorus removal lightweight material is loaded into a fluidized bed reactor or a fixed bed reactor and subjected to inoculation and biofilm formation, and the sewage is introduced into the fluidized bed reactor or the fixed bed reactor to conduct a nitrogen and phosphorus removal treatment.

In the present invention, by highly fusing the sulfur and the iron sulfides, it enables the hydrogen ions generated when nitrogen removal by denitrification is conducted by microorganisms using sulfur to react with iron sulfides more easily, of which the reaction equation is as follows:

$$FeS + H^+ = Fe^{2+} + HS^- \qquad (4)$$

$$5Fe^{2+} + NO_3^- + 6H^+ \rightarrow 5Fe^{3+} + 0.5N_2 + 3H_2O \qquad (5)$$

$$5HS^- + 8NO_3^- + 3H^+ \rightarrow 5SO_4^{2-} + 4N_2 + 4H_2O \qquad (6)$$

This accelerates the dissolution of the iron sulfides, and increases the denitrification rate of the iron sulfides, thereby exerting the synergistic effect of sulfur autotrophic denitrification and iron sulfides autotrophic denitrification, and increasing the overall denitrification rate; and the generated ferrous ions and iron ions react with phosphate in water to form insoluble ferrous phosphate and ferric phosphate, achieving a good phosphorus removal effect.

Prior to this, the applicant also adopts other types of iron-bearing minerals to prepare nitrogen and phosphorus removal lightweight materials. Although the nitrogen and phosphorus removal lightweight materials have better nitrogen and phosphorus removal effects, but the nitrogen removal rates of them are relatively poor, such that the nitrogen removal effect and the phosphorus removal effect are not matched. This problem has been troubled people all along, and thereafter, the applicant conducts in-depth research and innovatively proposes the use of iron sulfides as the iron-based component, thereby exerting the synergistic effect of the sulfur autotrophic denitrification and the iron sulfides autotrophic denitrification, and increasing the overall denitrification rate, especially the rate of nitrogen removal.

Compared with the prior art, the beneficial effects of the present invention are embodied in:

(1) in the method for preparing a simultaneous nitrogen and phosphorus removal lightweight material of the present invention, by highly melting and mixing the sulfur and the iron sulfides, it enables the hydrogen ions generated when nitrogen removal by denitrification is conducted by microorganisms using sulfur to react with iron sulfides more easily, thereby facilitating the dissolution of iron sulfides and increasing the overall denitrification rate;

(2) in the method for preparing a simultaneous nitrogen and phosphorus removal lightweight material of the present invention, the molten mixture is subjected to a foaming treatment before the cooling and molding of the molten mixture, which not only increases the denitrification rate of the iron sulfides, but also exerts the synergistic effect of sulfur autotrophic denitrification and iron sulfides autotrophic denitrification to a great extent, and the generated ferrous ions and iron ions react with phosphate in water to form insoluble ferrous phosphate and ferric phosphate, achieving a good phosphorus removal effect;

(3) in the method for preparing a simultaneous nitrogen and phosphorus removal lightweight material of the present invention, a lightweight material is formed by dispersing bubbles in the molten mixture of molten sulfur, iron sulfides and carbonates of calcium and magnesium in a physical or chemical foaming manner, such that the lightweight material has the characteristics of high porosity, a large specific surface area, a light weight, a high reaction activity, and a good microbial attachment performance;

(4) the simultaneous nitrogen and phosphorus removal lightweight material of the present invention with a density of 0.9-2.5 g/cm$^3$, which has low density, light material, easy availability of raw materials, and simple preparation, applies to be used as a filler for a sewage treatment facility such as a fluidized bed or a fixed bed, not only has a low cost but also has high and stable processing efficiency.

(5) for the use of the simultaneous nitrogen and phosphorus removal lightweight material of the present invention, the simultaneous nitrogen and phosphorus removal lightweight material of the present invention is used as a filler for a fluidized bed or fixed bed reactor in the sewage treatment, then the nitrogen and phosphorus pollutants is deeply removed from water through the action of microorganisms, with both the nitrogen removal effect and the phosphorus removal effect being greater than 99% through the treatment with the fluidized bed reactor, and the nitrogen removal effect reaching 99% while the phosphorus removal effect reaching 91% through the treatment with the fixed bed reactor.

DESCRIPTION OF THE EMBODIMENTS

The present invention is further described below in connection with specific embodiments.

The exemplary embodiments of the present invention are illustrated hereafter in detail with reference to the accompanying drawings. Although these exemplary embodiments are described in sufficient detail to enable those skilled in the art to practice the present invention, it should be understood that other embodiments may be implemented and various changes may be made to the present invention without departing from the spirit and scope of the present invention. The following more detailed description of the embodiments of the present invention is not intended to limit the scope of the present invention, but is merely for illustration without limiting the description of the features and characteristics of the present invention, so as to propose a best mode of practice the present invention, and is sufficient to enable those skilled in the art to implement the present invention. Therefore, the scope of the present invention is limited only by the appended claims.

EXAMPLE 1

Sulfur and an iron-based component were weighed in a mass ratio of 6:1, where the iron-based component was iron sulfides with the particle size of ≤0.2 mm; 95 wt % of the aforementioned iron sulfides was taken, and heated together with the sulfur to 140° C. for high-temperature melting, during the high-temperature melting the molten mixture needed to be continuously stirred until no lump-like or granular matter existed in the molten mixture and the color of the molten mixture was uniform and stable, so as to obtain a uniform molten mixture, and then the remaining 5 wt % of the aforementioned iron sulfides was taken and mixed with sodium bicarbonate, and added into the molten mixture for a foaming treatment, where in the molten mixture, the mass ratio of the sulfur, iron sulfides and sodium bicarbonate was 150:25:1; during the foaming process the molten mixture was continuously stirred mechanically at a stirring speed of 150 rpm for a stirring time of 20 minutes, such that the bubbles were dispersed in the molten mixture; and finally, cooling and molding was conducted by adopting a wet granulation method, so as to prepare the simultaneous nitrogen and phosphorus removal lightweight material.

EXAMPLE 2

The effect of a physical foaming manner and a chemical foaming manner on the performance of the material was studied when the mass ratio of the sulfur to the iron-based components was >3, and the results were shown in Table 1.

The basic content of this Example was the same as that of the Example 1, except that in this Example the physical foaming manner was adopted, where the aforementioned iron-based component and the sulfur were melted by heating to 160° C. to obtain a molten mixture, and the a nitrogen gas preheated to 50° C. was introduced for a physical foaming treatment; and the foamed molten mixture was cooled and molded by adopting a steel band granulation method, so as to obtain the simultaneous nitrogen and phosphorus removal lightweight material with highly fused sulfur and iron sulfides.

TABLE 1

The effect of different foaming manners on the performance of the material when the mass ratio of the sulfur to the iron-based component was >3

| Groups | Example 1 | Example 2 |
|---|---|---|
| Foaming Manner | Chemical Foaming | Physical Foaming |
| Material Density (g/cm$^3$) | 2.5 | 2.7 |
| Porosity (%) | 48 | 43 |

Conclusion 1: it could be seen from the comparison between Example 1 and Example 2 that, when the mass ratio of the sulfur to the iron-based components was >3, the effect was better when the chemical foaming manner was adopted.

EXAMPLE 3

The basic content of this Example was the same as that of Example 1, except that the mass ratio of the sulfur to the iron-based component in this Example was 3:1, and as measured the obtained material had a density of about 1.5 g/cm$^3$.

EXAMPLE 4

The effect of a physical foaming manner and a chemical foaming manner on the performance of the material was studied when the mass ratio of the sulfur to the iron-based components was ≤3, and the results were shown in Table 2.

The basic content of this Example was the same as that of Example 1, except that the mass ratio of the sulfur to the iron-based component in this Example was 3:1. The physical foaming manner was adopted, where the aforementioned iron-based component and the sulfur were melted by heating to 160° C. to obtain a molten mixture, and the a nitrogen gas preheated to 50° C. was introduced for a physical foaming treatment; and the foamed molten mixture was cooled and molded by adopting a steel band granulation method, so as to obtain the simultaneous nitrogen and phosphorus removal lightweight material with highly fused sulfur and iron sulfides.

TABLE 2

The effect of different foaming manners on the performance of the material when the mass ratio of the sulfur to the iron-based component was ≤3

| Groups | Example 3 | Example 4 |
|---|---|---|
| Foaming Manner | Chemical Foaming | Physical Foaming |
| Material Density (g/cm$^3$) | 2.49 | 2.3 |
| Porosity (%) | 42.1 | 47.5 |

Conclusion 2: it could be seen from the comparison between Example 3 and Example 4 that, when the mass ratio of the sulfur to the iron-based components was ≤3, the effect was better when the physical foaming manner was adopted.

EXAMPLES 5-7

When the iron-based component was iron sulfides, i.e., the mass ratio of the iron sulfides to the carbonates of calcium and magnesium being 1:0, on the basis of Examples 1 and 4, different mass ratios of the sulfur to the iron-based component on the performance of the material was studied, and the result was shown in Table 3. The remaining parameters of Examples 5-7 and Comparative Examples 1-2 were substantially the same as those of Example 1 except for the mass ratio of the sulfur to the iron-based component and the foaming manner.

TABLE 3

The effect of different mass ratios of the sulfur to the iron-based component on the performance of the material

| Groups | Mass ratio of the sulfur to the iron-based component | Foaming Manner | Material Density (g/cm$^3$) | Porosity (%) |
|---|---|---|---|---|
| Comparative Example 1 | 6.5:1 | Chemical Foaming | 2.6 | 45.3 |
| Example 1 | 6:1 | Chemical Foaming | 2.56 | 46.2 |
| Example 4 | 3:1 | Physical Foaming | 2.3 | 47.5 |
| Example 5 | 4:3 | Physical Foaming | 2.42 | 46.9 |
| Example 6 | 1:1 | Physical Foaming | 2.1 | 49.1 |
| Example 7 | 1:2 | Physical Foaming | 1.05 | 51.3 |
| Comparative Example 2 | 1:1.25 | Physical Foaming | 1.9 | 49.4 |

Conclusion 3: it could be seen from Table 3 that, when the mass ratio of the sulfur to the iron-based component was 1:1, and the mass ratio of the iron sulfides to the carbonates of calcium and magnesium was 1:0, the obtained material had a relatively smaller density by using the physical foaming manner. Moreover, when the mass ratio of the sulfur to the iron-based component was greater than 6:1 or less than 1:2, the obtained material had a density of 1.05-2.56 and a porosity of 46.2-51.3.

EXAMPLES 8-9

On the basis of the mass ratio of the sulfur to the iron-based component being 1:1, i.e., on the basis of Example 6, the effects of different mass ratios of the iron sulfides to the carbonates of calcium and magnesium in the iron-based component on the performance of the material were studied, and the results were shown in Table 4. The remaining parameters of Examples 8-9 and Comparative Example 3 were substantially the same as those of Example 6 except for the mass ratio of the iron sulfides to the carbonates of calcium and magnesium.

TABLE 4

The effect of different mass ratios of the iron sulfides to the carbonates of calcium and magnesium calcium on the performance of the material

| Groups | Mass ratio of the iron sulfides to the carbonates of calcium and magnesium | Foaming Manner | Material Density (g/cm$^3$) | Porosity (%) |
|---|---|---|---|---|
| Example 6 | 1:0 | Physical Foaming | 1.9 | 49.3 |
| Example 8 | 1:2 | Physical Foaming | 0.9 | 52.3 |
| Example 9 | 1:4 | Physical Foaming | 1.8 | 49.8 |
| Comparative Example 3 | 1:4.3 | Physical Foaming | 2.3 | 46.5 |

Conclusion 4: it could be seen from Table 4 that, when the mass ratio of the sulfur to the iron-based component was 1:1, and the mass ratio of theiron sulfides to the carbonates of calcium and magnesium was 1:2, the prepared material had a relatively smaller density. Moreover, when the mass ratio of the iron sulfides to the carbonates of calcium and magnesium was less than 1:4, the obtained material had a density of <1.8 and a porosity of >49.8.

EXAMPLE 10

On the basis of Example 1, the effects of different foaming agents on the performance of the material were studied, and the results were shown in Table 5. The remaining parameters of Example 10 and Comparative Example 4 were substantially the same as those of Example 1 except that the different types of the foaming agents.

TABLE 5

The results for effects of different foaming agents on the performance of the material

| Groups | Foaming Agent | Material Density (g/cm$^3$) | Porosity (%) |
|---|---|---|---|
| Example 1 | Sodium Bicarbonate | 2.5 | 49.7 |
| Example 10 | Foaming Agent AC | 2.7 | 45.8 |
| Comparative Example 4 | Hydrogen peroxide | 2.9 | 42.3 |

Conclusion 5: it could be seen from Table 5 that, when sodium bicarbonate was used as the foaming agent, the performance of the obtained material was optimal, and the foaming effect of hydrogen peroxide as the foaming agent was very poor.

EXAMPLE 11

The basic content of this Example was the same as that of Example 1, except that the mass ratio of the sulfur to the iron-based component in this Example was 1:2, where the iron-based component was iron sulfides and the carbonates of calcium and magnesium, and the mass ratio of the iron sulfides to the carbonates of calcium magnesium was 1:2. Sulfur was mixed with iron sulfides and the carbonates of calcium magnesium to obtain a mixed material, and the mixed material was heated to 160° C. for high-temperature melting, so as to obtain a molten mixture.

The aforementioned molten mixture was subjected to a chemical foaming treatment by adding sodium bicarbonate as the chemical foaming agent. The mass ratio of the sulfur, the iron sulfides, the carbonates of calcium and magnesium, and the foaming agent was 300:600:10. During the foaming process, the molten mixture was continuously stirred mechanically at the stirring speed of 150-250 rpm for the stirring time of 30 minutes, so that the bubbles were dispersed in the molten mixture; and finally, cooling and molding were conducted to prepare the simultaneous nitrogen and phosphorus removal lightweight material. The obtained material has a density of about 1.23 1.23g/cm$^3$ as measured.

EXAMPLE 12

The basic content of this Example was the same as that of Example 1, except that: in this Example the sulfur and the iron-based component were mixed at the mass ratio of 4:3 to obtain a mixed material, where the iron-based component was iron sulfides and the carbonates of calcium and magnesium, and the mass ratio of the iron sulfides to the carbonates of calcium and magnesium was 2:1. The sulfur was mixed with the iron sulfides and the carbonates of calcium and magnesium to obtain a mixed material, and the mixed material was heated to 150° C. for high-temperature melting, and during the melting process the molten mixture needed to be stirred mechanically until a uniform molten mixture was obtained. Finally, the simultaneous nitrogen and phosphorus removal lightweight material was obtained by cooling and molding, and the obtained material had a density of about 2.91 g/cm$^3$ as measured.

Figure 1:
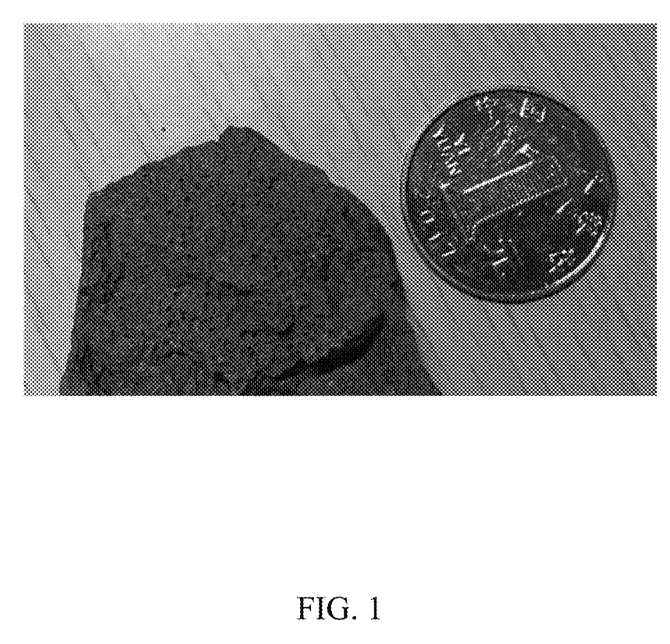
FIG. 1 is a picture of a real product of a simultaneous nitrogen and phosphorus removal lightweight material prepared in Example 8 of the present invention.
Figure 2:
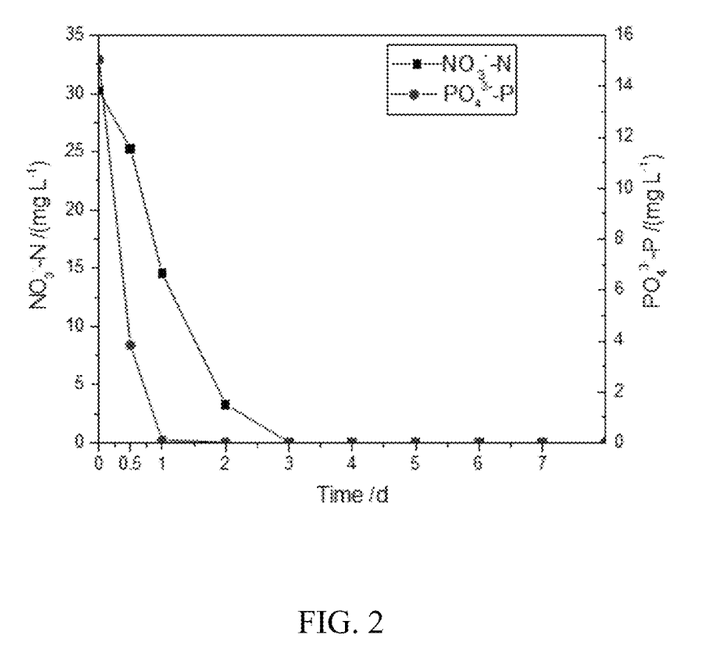
FIG. 2 is a diagram showing the denitrification and dephosphorization effects of a simultaneous nitrogen and phosphorus removal lightweight material prepared in Example 8 of the present invention as a filler of a fixed bed reactor.

Sewage Treatment Effect:

1. The nitrogen and phosphorus removal effects of the material prepared in Example 8 as a filler of a fixed bed reactor was studied;

10 g of the material prepared in Example 8 was weighed and ready for use. Added into a batch tube reaction vessel was 50 mL of sewage containing 30 mg/L $NO_3^-$—N and 15 mg/L $PO_4^{3-}$—P and 10 g of the lightweight material, and 3.5 mL of a bacteria solution containing 10% by mass of sulfur autotrophic denitrifying bacteria (the volume of the bacteria solution accounting for 7% of the volume of the wastewater) was added into reaction vessel. The aforementioned mixed solution was purged with nitrogen for oxygen removal, and then sealed with a cap for a denitrification reaction process. The mixed solution was cultured for 10 days, and detected for the concentrations of $NO_3^-$—N and $PO_4^{3-}$—P in the reaction vessel respectively on days 0.5, 1, 2, 3, 4, 5, 6, 7, 8, 9, and 10. Nitrogen and phosphorus were almost completely removed from the reactor within about 3 days, and the specific nitrogen and phosphorus removal data was shown in FIG. 2.

2. The nitrogen and phosphorus removal effects of the material prepared in respective examples as a filler of a fluidized bed reactor were studied:

After the simultaneous nitrogen and phosphorus removal lightweight materials prepared in the above Examples 1-11 were separately crushed, the material having an average particle size of 2.6 mm was sieved for the use as the filler.

Experimental Method:

1) Biofilm formation: the filler was loaded into a fluidized bed reactor, inoculated with anaerobic sludge and added with a culture solution, and incubated for 7 days to complete the biofilm formation.

2) Biological treatment: influent water was introduced into the reactor, with the hydraulic retention time being 6 h, the flow rate of the influent water being 50 mL/min, the treatment operated at a constant temperature of 28° C. with protection from light for 100 days, and during the treatment process, the average nitrate nitrogen of the influent water was 31.9 mg/L, and the average phosphate phosphorus of the influent water was 1.98 mg/L.

Experimental results: the effects of the fillers of respective examples on the sewage nitrogen and phosphorus removal effects under the same conditions were shown in Table 1.

TABLE 1

The sewage nitrogen and phosphorus removal effects of the fillers of respective examples

| Groups | Density (g/cm$^3$) | Average nitrate nitrogen of the effluent water (mg/L) | Nitrogen Removal Rate (%) | Average phosphate phosphorus of the effluent water (mg/L) | Phosphorus Removal Rate (%) |
|---|---|---|---|---|---|
| Example 1 | 2.5 | 0.45 | 97.88 | 0.24 | 90.07 |
| Example 2 | 2.7 | 0.48 | 97.56 | 0.26 | 90.02 |
| Example 3 | 2.49 | 0.39 | 98.12 | 0.23 | 90.04 |
| Example 4 | 1.5 | 0.34 | 98.21 | 0.20 | 90.13 |
| Example 5 | 2.42 | 0.37 | 98.19 | 0.24 | 90.06 |
| Example 6 | 2.1 | 0.32 | 98.33 | 0.25 | 90.05 |
| Example 7 | 1.05 | 0.31 | 98.54 | 0.25 | 90.06 |
| Example 8 | 0.9 | 0.29 | 98.87 | 0.21 | 90.26 |
| Example 9 | 1.8 | 0.36 | 98.21 | 0.22 | 90.18 |
| Example 10 | 2.7 | 0.35 | 98.26 | 0.23 | 90.06 |
| Example 11 | 1.23 | 0.32 | 98.98 | 0.20 | 90.39 |
| Example 12 | 2.91 | 0.32 | 98.99 | 0.19 | 90.40 |

Figure 3:
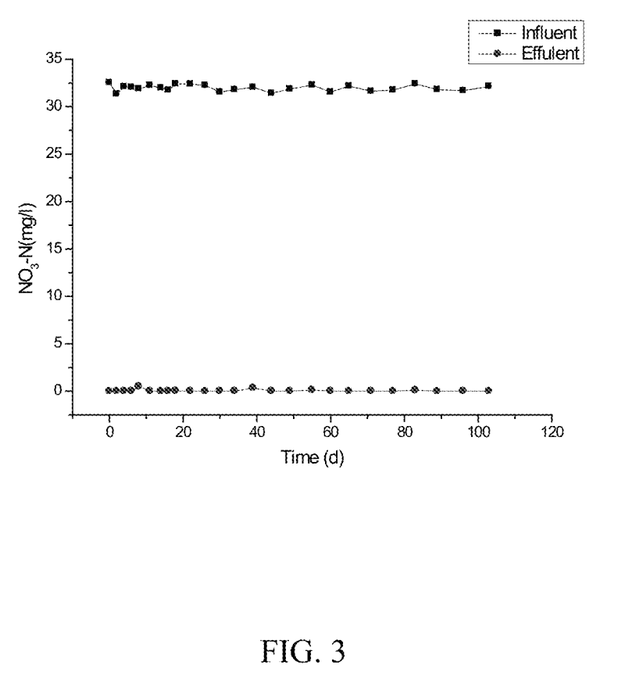
FIG. 3 is a diagram showing the nitrogen removal effect of a simultaneous nitrogen and phosphorus removal lightweight material prepared in Example 8 of the present invention as a filler of a fluidized bed reactor.
Figure 4:
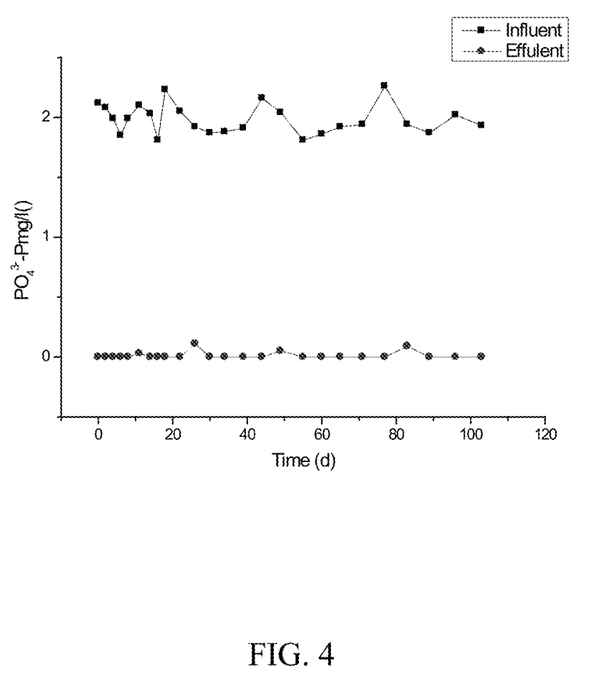
FIG. 4 is a diagram showing the phosphorus removal effect of a simultaneous nitrogen and phosphorus removal lightweight material of Example 8 of the present invention as a filler of a fluidized bed reactor.

In the above experimental process, for the material prepared in Example 8, during sewage treatment, the specific nitrogen removal data was shown in FIG. 3, and the specific phosphorus removal data was shown in FIG. 4.

Conclusion: using the simultaneous nitrogen and phosphorus removal lightweight material of the present invention as a microbial carrier in a fixed bed or fluidized bed reactor for sewage biochemical treatment, the microorganisms simultaneously used sulfur and iron sulphides in the loaded lightweight material as electron donors for nitrogen removal by denitrification, and meanwhile the microbial metabolites iron ions as well as calcium and magnesium ions, were precipitated for phosphorus removal, thereby achieving efficient simultaneous nitrogen and phosphorus removal.

What is claimed is:

1. A method for preparing a simultaneous nitrogen and phosphorus removal material, comprising the steps of:
    S1: weighing sulfur and an iron-based component in a mass ratio of 6:1-1:2, wherein the iron-based component is a mixture composed of iron sulfides and carbonates of calcium and magnesium in a mass ratio of 1:0-1:4;
    S2: when the mass ratio of the sulfur to the iron-based component is <3, heating and melting the aforementioned iron-based component and sulfur to obtain a molten mixture, and introducing a gas preheated to a temperature not lower than 50° C. for a physical foaming treatment;
    when the mass ratio of the sulfur to the iron-based component is >3, taking 95 wt% of the aforementioned iron-based component, heating and melting it together with the sulfur to obtain a molten mixture, then taking and mixing the remaining 5 wt% of the iron-based component with a chemical foaming agent, and adding into the molten mixture for a foaming treatment; and
    S3: cooling and molding the foamed molten mixture to obtain the simultaneous nitrogen and phosphorus removal material in which the sulfur is fused and mixed with the iron based component.

2. The method for preparing a simultaneous nitrogen and phosphorus removal material according to claim 1, wherein the temperature for the heating and melting is 140-160° C.

3. The method for preparing a simultaneous nitrogen and phosphorus removal material according to claim 1, wherein the iron-based component has a particle diameter of <0.2 mm.

4. The method for preparing a simultaneous nitrogen and phosphorus removal material according to claim 1, wherein the chemical foaming agent comprises one or both of sodium bicarbonate and a foaming agent AC.

5. The method for preparing a simultaneous nitrogen and phosphorus removal material according to claim 1, wherein the molten mixture is continuously stirred during heating and melting, and the molten mixture is subjected to the foaming treatment when a color of the molten mixture is uniform and stable, and the molten mixture is continuously stirred during the foaming treatment.

6. The method for preparing a simultaneous nitrogen and phosphorus removal lightweight material according to claim 1, wherein the cooling and molding is wet granulation, steel belt granulation, or post-solidification crushing granulation.

7. The use of a simultaneous nitrogen and phosphorus removal material prepared by the method according to claim 1, wherein the simultaneous nitrogen and phosphorus removal material is loaded into a fluidized bed reactor or a fixed bed reactor and subjected to inoculation and biofilm formation, and the sewage is introduced into the fluidized bed reactor or the fixed bed reactor to conduct a nitrogen and phosphorus removal treatment.

* * * * *